Dec. 20, 1932.　　　C. G. MORTIMER　　　1,891,626
MACHINE FOR MAKING SLABS
Filed Jan. 9, 1931　　　3 Sheets-Sheet 1

INVENTOR
C. G. MORTIMER,
BY
ATTORNEY

Dec. 20, 1932.   C. G. MORTIMER   1,891,626
MACHINE FOR MAKING SLABS
Filed Jan. 9, 1931   3 Sheets-Sheet 2

INVENTOR
C. G. MORTIMER,
BY
ATTORNEY

Dec. 20, 1932.  C. G. MORTIMER  1,891,626
MACHINE FOR MAKING SLABS
Filed Jan. 9, 1931  3 Sheets-Sheet 3
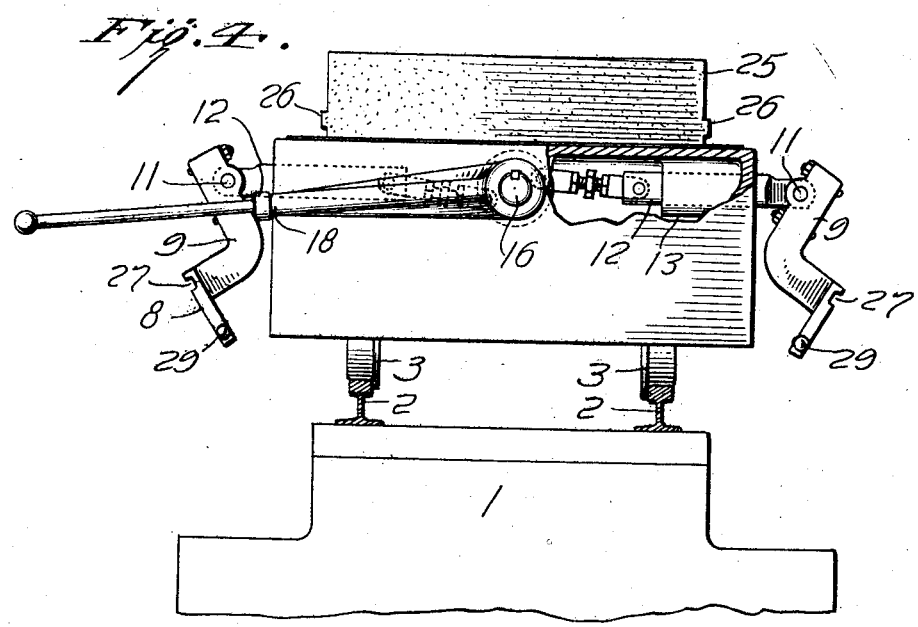
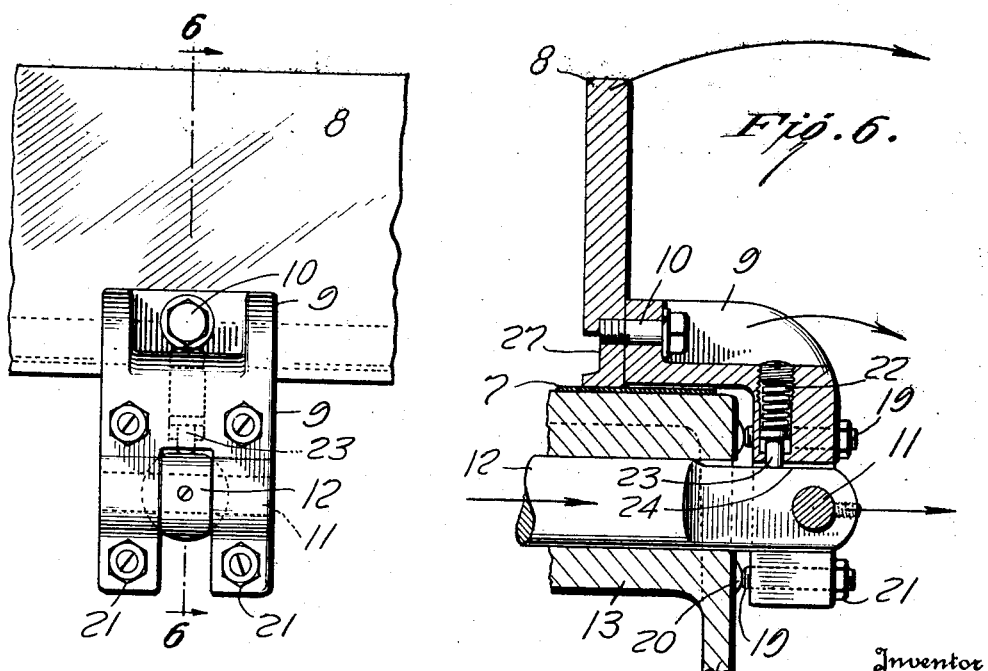
Inventor
C. G. MORTIMER,
By
Attorney

UNITED STATES PATENT OFFICE

CHARLES G. MORTIMER, OF GLEN RIDGE, NEW JERSEY, ASSIGNOR TO STRUCTURAL GYPSUM CORPORATION, OF LINDEN, NEW JERSEY, A CORPORATION OF DELAWARE

MACHINE FOR MAKING SLABS

Application filed January 9, 1931. Serial No. 507,592.

The present invention relates to an apparatus for casting shapes from plastic material and has particular application to the casting of slabs or the like of gypsum.

The principal object of the invention is the provision of a molding device which may be readily prepared for use, quickly manipulated to receive the molding charge, and positively and efficiently freed from the cast material after the same has been set, to the end that production of such shapes may be speeded up and cheapened.

In the art of casting gypsum slabs, it has been the practice heretofore to make use of a stationary table, the top portion of which forms the bottom or bed of a series of molds, with built-up side rails or walls and division end plates, the calcined gypsum gauged with the requisite amount of water, and with or without accelerator, retarder or filler, being poured from a travelling bucket or the like into the thus formed molds. Such an arrangement has proved to be awkward and slow for the following reasons. First, the bucket containing the plastic material could only contain a limited quantity of plaster, which often became completely used up without filling a mold to the desired extent, particularly true where a consecutive series of molds were being filled. This necessitated the return of the bucket to the supply, with consequent danger of setting of the partially filled mold in the meantime. Second, the side and end rails were usually hand placed on a table and secured there by wooden wedges or the like. Such a procedure was not only cumbersome but many times was inaccurate as not giving the exact dimensions to the cast shape with any degree of uniformity. Third, upon setting of the gypsum, the rails having a tendency to stick to the sides of the slabs, required a considerable amount of force to break them away from the casting and unless a great deal of care was exercised in their removal, the slab became damaged at its edges.

This invention is, therefore, concerned with overcoming the above defects in the present system of casting, and contemplates in one of its aspects, the use of a mobile carriage or table forming the bottom or bed of a series of mold forms, the carriage being movable beneath a stationary feed spout or the like, which continuously feeds the plastic material thereto. The carriage or table is provided with side rails carried on brackets hinged to the table, and means are provided for accurately and positively placing and removing the rails in their proper location on the table so as to always produce a mold accurately conforming to desired specifications. Such means in one form may consist of a rotary toggle element connected by an expansible link assembly to oppositely slidable arms carrying the hinged brackets. A handle suitably located within easy reach of the operator is provided to cause rotation of the toggle assembly to move the slidable arms toward or away from each other, which consequently moves the side rails of the mold form into or out of position on the table. Additional means are provided to throw the side rails upwardly away from the table upon movement of the arms carrying the brackets. In this manner, the rails are quickly, easily and uniformly released from the sides of the cast slab without causing damage thereto. The slab may then be readily removed from the table.

The invention further consists in the novel arrangement, combination and construction of parts hereinafter described and shown in the drawings.

In the drawings—

Fig. 4 is an end view of the carriage, showing the side rails released from a cast slab.

Fig. 5 is a detail side view showing a rail bracket and a portion of rail.

Fig. 6 is a sectional view along the lines 6—6 of Fig. 5.

Figure 1:
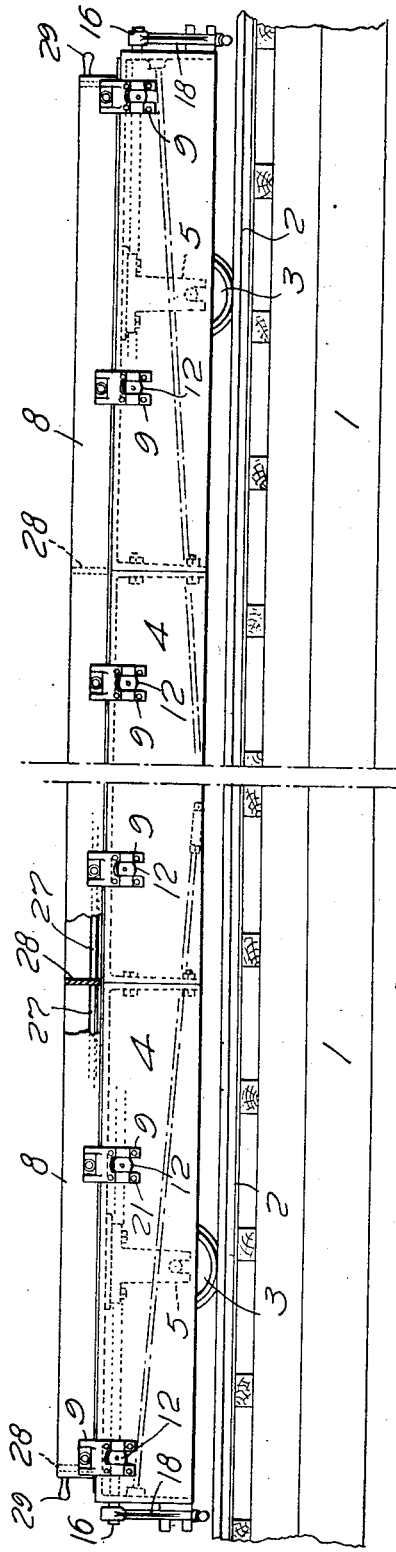
Fig. 1 is a side elevation of a mold carriage embodying the invention.

Referring now with particularity to the embodiment illustrated, there is shown at 1 a base of concrete or the like, upon which are mounted rails 2 to receive the wheels 3 of the mobile carriage 4. These wheels are carried on axles which are mounted in bearings 5.

The carriage 4 consists of a top or bed portion 6, forming the bottom of the mold proper. In order to minimize sticking of the cast gypsum products to the mold, the bed portion 6 is overlaid with a rubber sheet or the like 7.

The sides of the mold are defined by walls or rails 8 secured to brackets 9 as by means of bolts 10, the walls 8 being preferably of substantially the entire length of the carriage 4 so as to form with end plates a continuous series of molds.

The brackets 9 are pivotally mounted as at 11 on movable arms 12 which slide in built-up portions 13 on the underside of the table or carriage 4. Each slidable arm 12 is connected as by means of expansible links 14 to a rotary toggle element 15 keyed to a shaft 16 running the entire length of the table and mounted in bearings 17 beneath the same. At each end of the table a handle 18 is mounted on the projecting end of the shaft 16 so that the latter may be rotated.

Figure 3:
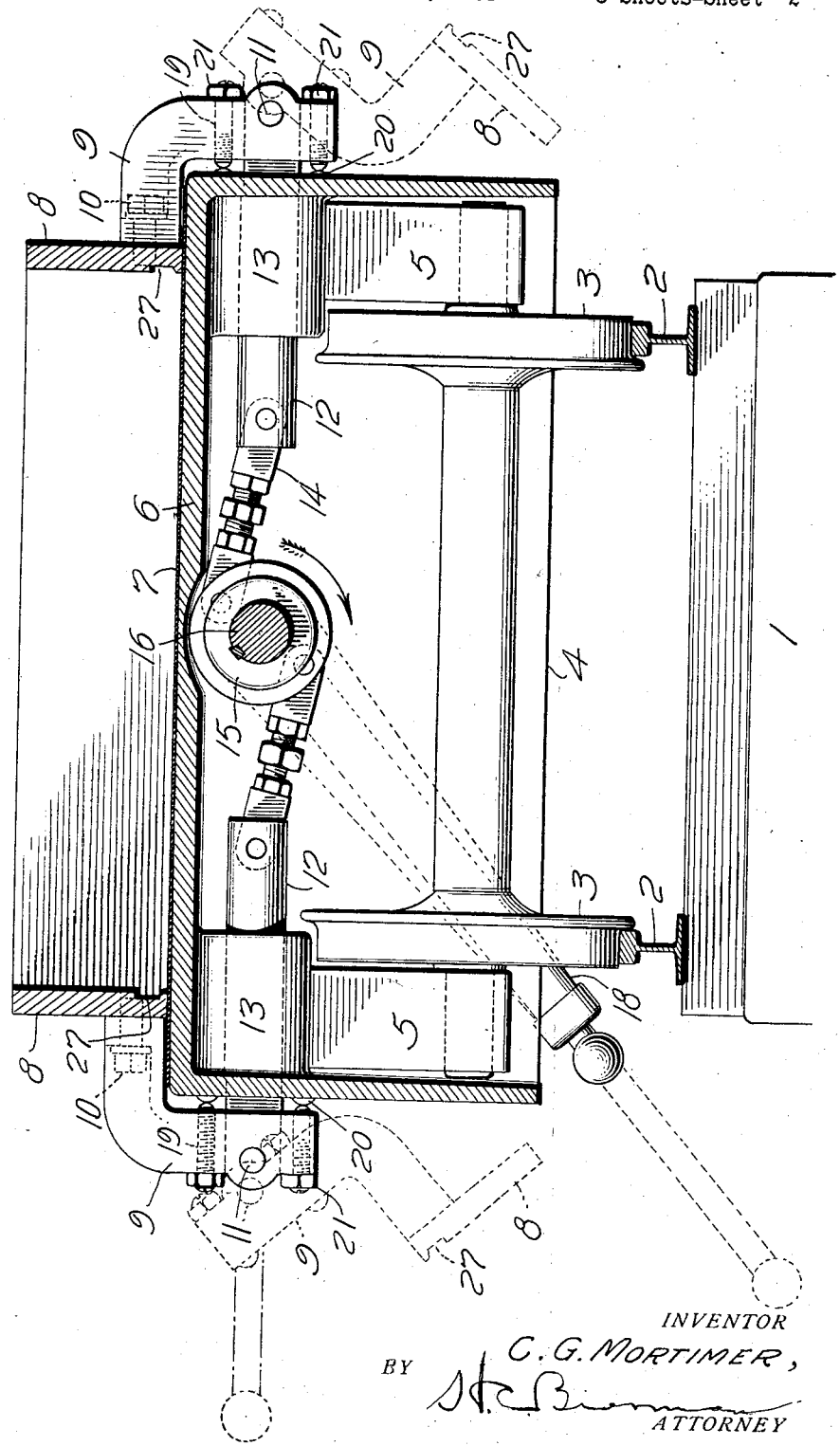
Fig. 3 is a transverse sectional elevation of the device of Figs. 1 and 2, showing in dotted lines the side rails in opened position.

As clearly shown in Figs. 3 and 4, when the handle 18 is moved to its extreme low position, it causes counter-clockwise movement of the toggle 15 and consequent movement of the slidable arms 12 toward each other. This causes the side rails 8 to be likewise drawn towards each other and into the desired position on the table to define the sides of the mold. Movement of the handle 18 into the position shown in Fig. 4 causes clockwise movement of the toggle 15, which through the arms 12 causes movement of the rails away from each other and away from the sides of the cast block. Continued movement of the handle 18 and associated parts in this direction will permit the brackets 9 carrying the rails 8 to be rotated about their pivots in a position shown in Fig. 4, which entirely frees them from the block and locates them where they will be out of the way during the removal of the cast slab and subsequent cleaning and preparation of the table for another operation.

Means are provided for causing a close contact between the bottom of walls 8 and the rubber sheet 7, to prevent fins of plastic material forming on the slabs, or leakage of water from the mold. This means comprises two sets of adjusting screws 19 carried by the bracket above and below the slidable arms 12, which may be made to engage cams 20 on the side of the bed or top portion of the table. It is to be noted particularly from Fig. 6, that when the arm 12 is moved to the left, engagement of the ends of adjusting screws 19 with their cams 20, will force the bottom of the wall 8 into the desired degree of contact with the sheet 7. Lock nuts 21 may be provided to prevent accidental displacement of the adjusting screws.

Means are also provided to cause an upward movement of the rails 8 from the sheet 7 when it is desired to free the same from the blocks upon the first portion of the outward movement of the arms 12. This means may consist of a coil spring 22 located within a vertical cavity in the bracket 9, the spring bearing upon the plunger 23, which in turn bears upon a flattened portion 24 of the ends of the arms 12. It will thus be seen that the spring 22 always provides a tendency for the rail 8 to lift from the mat or sheet 7, but this is prevented if the ends of the adjusting screws 19 are in contact with their cams. However, movement to the right of arms 12 under clockwise movement of the toggle 15, immediately permits the spring 22 to cause partial rotation of the bracket 9 about its pivot 11, with the result that the rail 8 is lifted and freed from the sides of the block and the sheet 7. This movement is particularly desirable where a block 25 is cast as in Fig. 4, having a flange 26 thereon formed in the cavity 27 of the rail.

The side rails may be provided at intervals with slots to receive end plates 28 (Fig. 1) so as to form the slab into any desired length, individual slabs being broken from the end plates without difficulty after the side rails have been removed. It is, of course, contemplated that a rail 8 will constitute the sides of the molds for a consecutive series of blocks as shown in Fig. 1, so that when that rail is freed from the cast slabs, a series of molds will be opened simultaneously. Handles 29 are provided at the ends of the rails to assist the operator in completing the swinging movement of the rail and bracket about the latter's pivot after having been freed from the blocks by the toggle assembly.

Figure 2:
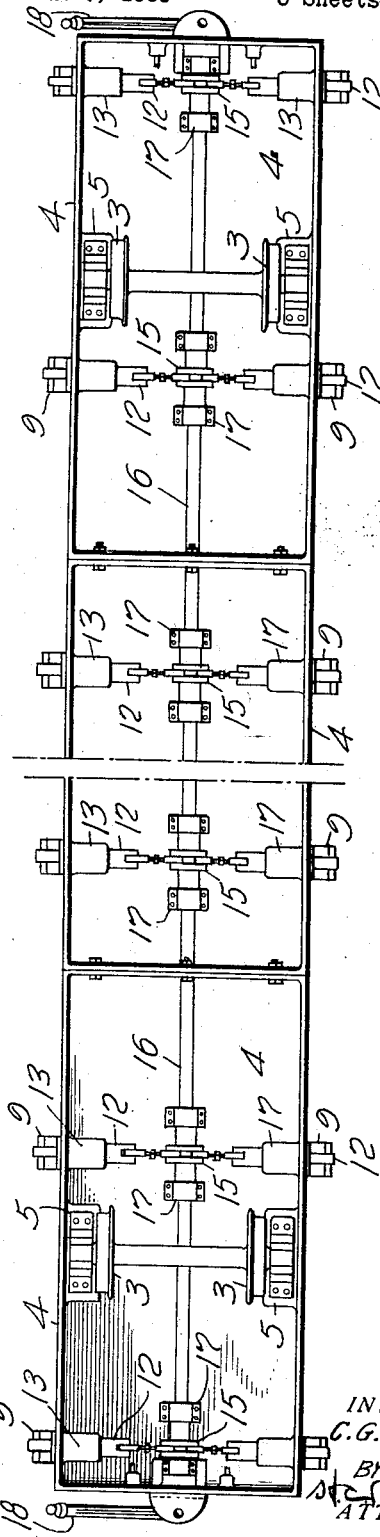
Fig. 2 is a bottom plan view of the device of Fig. 1.

In order to accurately and quickly release the side rails at all points, and to prevent distortion of the shaft 16, it may be desirable as shown in Fig. 2, to provide more than one toggle assembly for each length of shaft corresponding to a length of slab being formed.

It is contemplated in the utilization of the device of this invention, that the mobile car or carriage will be moved upon its track either manually or by power, beneath a filling spout adapted to supply plastic material gauged with the requisite amount of water and with or without accelerators, retarders, fillers or the like, substantially continuously. Devices for supplying material continuously are old in the art and hence no claim is made thereto and it is not thought necessary to illustrate the same. As the car moves beneath the filling spout, the required amount of plastic material is filled into the molds until all the molds on a carriage are full. The carriage or car may then be pushed to a part of the plant where the material in the molds will be permitted to set until ready for removal, and removed by manipulation of the rails as above set forth. Upon removal of the set slabs, the side rails are moved into operative position again as shown in Fig. 3 and the car pushed back beneath the spout for further loading.

While the invention has been shown and described with particular reference to a specific form of apparatus and with particular reference to the casting of gypsum forms, yet obviously the invention is not to be limited thereto but it is to be construed broadly and restricted only by the scope of the claims.

I claim:—

1. An apparatus for casting shapes of plastic material, comprising an element having a bed portion, upstanding walls on opposite sides of the bed, said walls being carried by brackets pivotally mounted to one side of the bed, and means to move each bracket and wall laterally of the bed, comprising a toggle assembly mounted below the upper surface of the bed and spring means to throw the wall upwardly upon lateral movement thereof.

2. An apparatus for casting shapes of plastic material, comprising an element having a bed portion, upstanding walls on opposite sides of the bed, each wall being carried by a bracket, an expansible and contractible toggle assembly below the bed pivotally carrying at each end thereof one of said brackets for moving said brackets laterally, and spring means to cause rotation thereof upon operation of the toggle.

3. An apparatus for casting shapes of plastic material, comprising an element having a bed portion, upstanding walls on opposite sides of the bed, means to move said walls laterally of the bed and means operable during the first part of the lateral wall movement to throw the walls upwardly away from the bed portion.

4. An apparatus for casting shapes of plastic material, comprising an element having a bed portion having a cam thereon, upstanding walls on opposite sides of the bed, each wall being carried by a bracket, an expansible and contractible toggle assembly below the bed pivotally carrying at each end thereof one of said brackets, and means carried by each bracket to determine and adjust the proximity of each wall to the bed, comprising adjusting screws penetrating the bracket and engaging the cam on the bed portion.

5. An apparatus for casting shapes of plastic material, comprising an element having a bed portion, upstanding walls on opposite sides of the bed, means to move said walls laterally of the bed and means operable during the first part of the lateral wall movement to throw the walls upwardly away from the bed portion; comprising a spring pressed plunger located in an aperture within the bracket.

In testimony whereof, I have hereunto subscribed my name this 5th day of January 1931.

CHARLES G. MORTIMER.